May 23, 1967 W. R. VIGNINI 3,321,332
BATTERY HOUSINGS
Filed Oct. 28, 1963 3 Sheets-Sheet 1
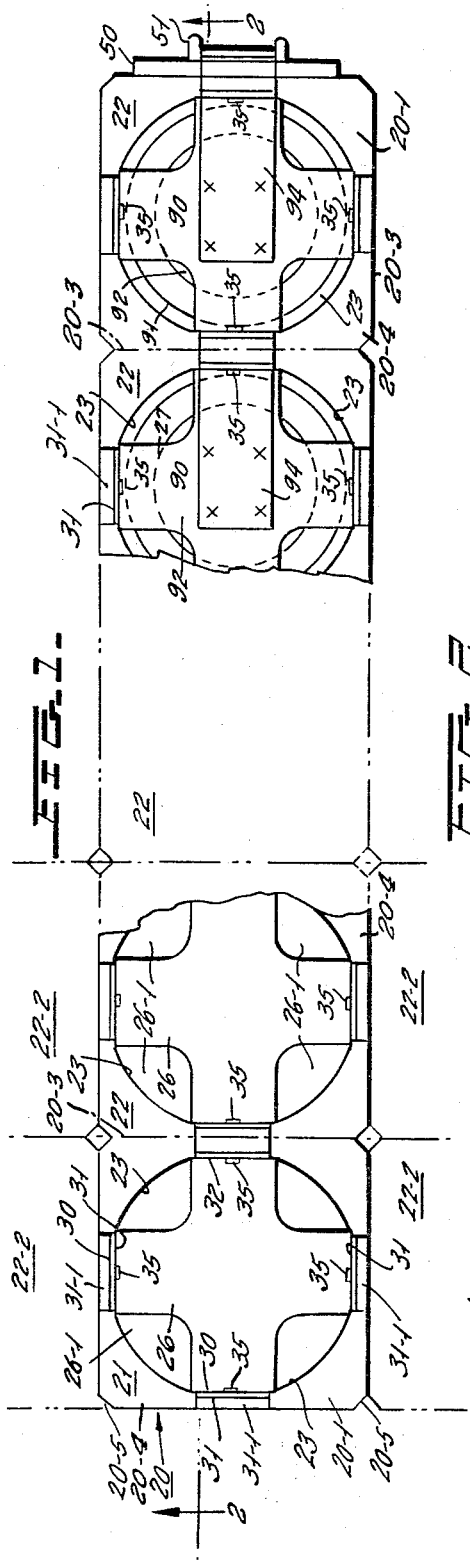
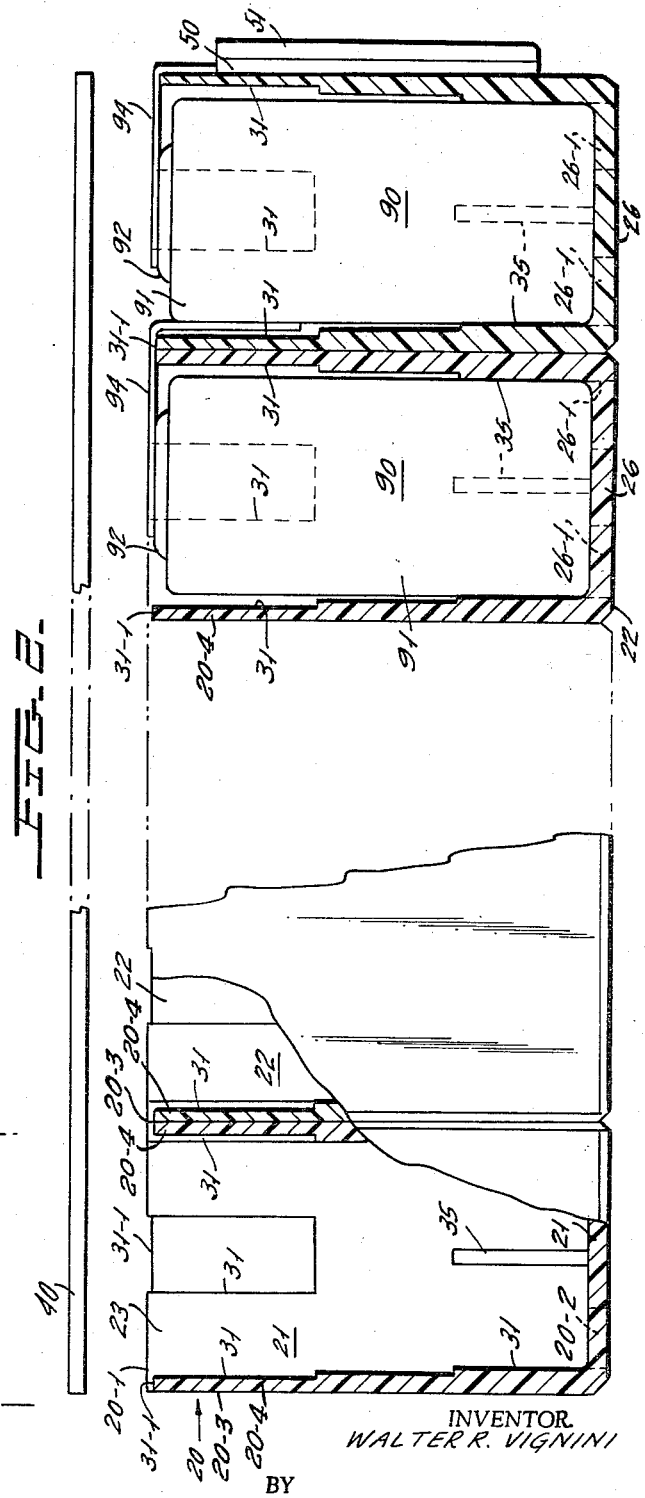
INVENTOR.
WALTER R. VIGNINI
BY
OSTROLENK, FABER, GERB & SOFFEN
ATTORNEYS May 23, 1967 W. R. VIGNINI 3,321,332
BATTERY HOUSINGS
Filed Oct. 28, 1963 3 Sheets-Sheet 2
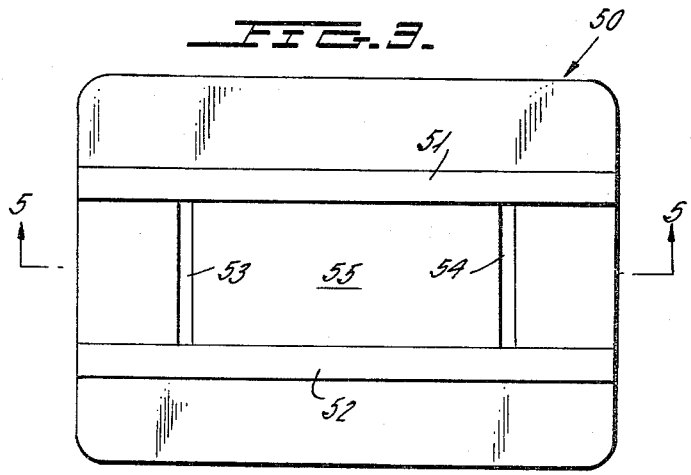
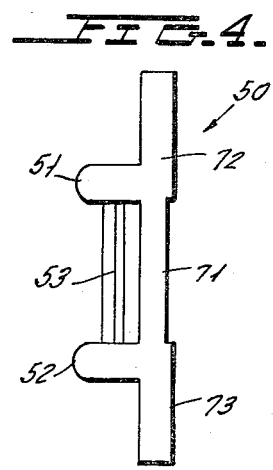
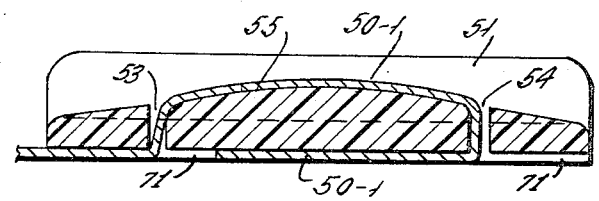
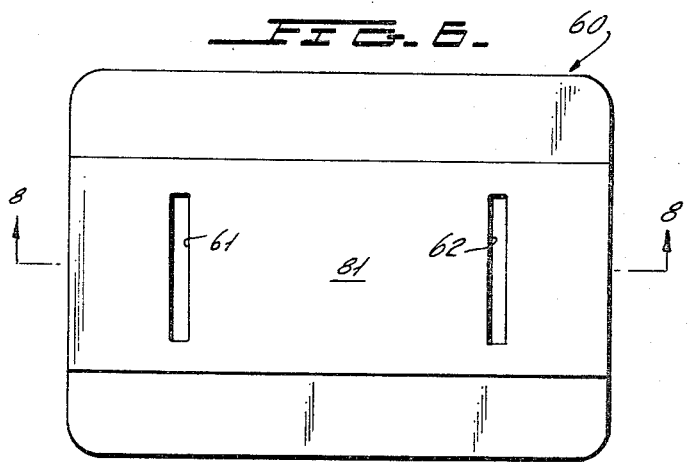
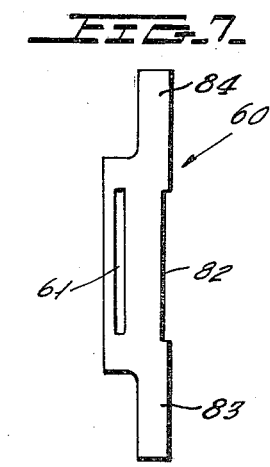
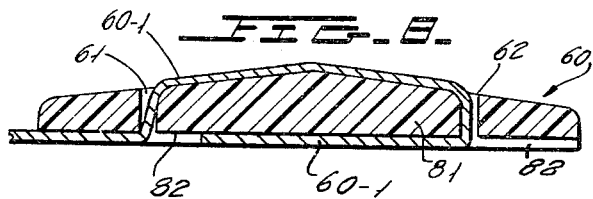
INVENTOR.
WALTER R. VIGNINI
BY
OSTROLENK, FABER, GERB & SOFFEN
ATTORNEYS

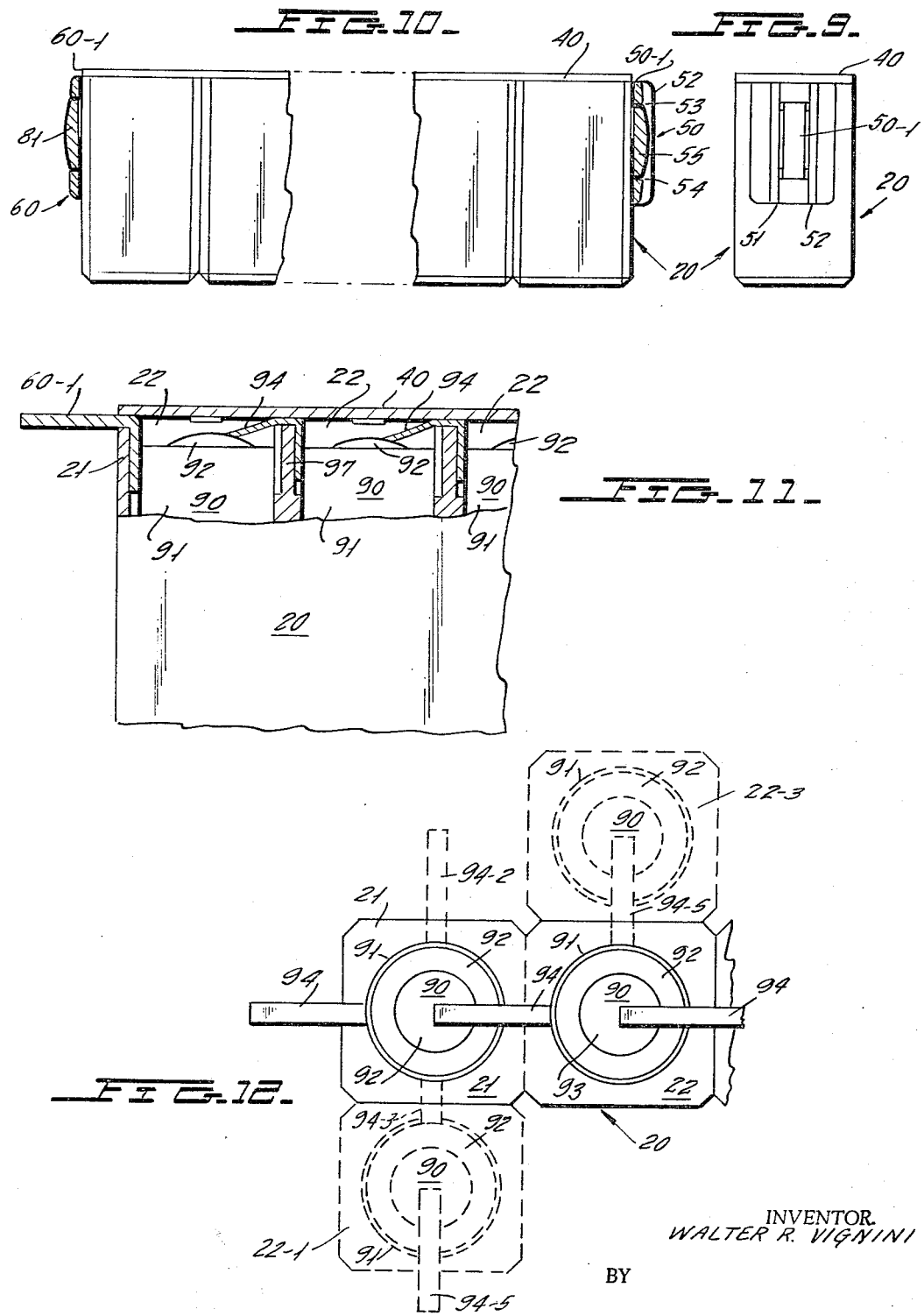

> United States Patent Office 3,321,332
Patented May 23, 1967

3,321,332
BATTERY HOUSINGS
Walter R. Vignini, Peekskill, N.Y., assignor to Sonotone Corporation, Elmsford, N.Y., a corporation of New York
Filed Oct. 28, 1963, Ser. No. 319,129
4 Claims. (Cl. 136—166)

This invention relates to a novel housing for batteries, and more specifically relates to a novel module arrangement for the packaging of sealed cells wherein the cells and their terminals may be assembled without the need for special tools.

In accordance with the present invention, a novel module housing of individual identical elements molded either individually or multiply from an appropriate plastic are arranged to receive a plurality of sealed cells with rigid engagement by a simple insertion process. Thereafter, a pair of novel terminal elements which are formed of an appropriate plastic are cemented to the assembled module arrangement and connected to the last cells of the circuit in a novel and inexpensive manner.

A primary object of this invention is, therefore, to provide a novel module packaging arrangement for sealed cells.

Another object of this invention is to provide a novel housing for sealed cells, which cells form a power supply of a given rating, wherein adjacent cells are insulated by the module structure.

A further object of this invention is to provide a novel module housing arrangement for sealed cells wherein plastic modules may be readily cemented together to form various arrays.

Yet another object of this invention is to provide a novel plastic module for the packaging of sealed cells which permits circulation of air to cool the cells.

A still further object of this invention is to provide a novel plastic module for housing sealed cells which serves as a shock-resistant container for the cells.

Yet another object of this invention is to provide a novel plastic module for housing a sealed cell wherein terminal tabs may be located in any of four positions.

A further object of this invention is to provide a novel plastic module arrangement for the packaging of sealed cells which permits the leading of cells from one side thereof to facilitate a mechanized assembly process.

Yet another object of this invention is to provide a novel tab assembly for a module housing for a sealed cell.

Another object of this invention is to provide a novel contact design for an array of battery modules, which contact utilizes a block of moldable material such as polystyrene that receives conductors without the requirement for tools, and which may be directly cemented to a cell housing.

These and other objects of this invention will become apparent from the following description when taken in connection with the drawings, in which:

FIGURE 1 is a top plan view of a multiple module cell housing constructed in accordance with the invention with the cover removed.

FIGURE 2 is a side elevational view of the multiple-module housing of FIGURE 1 with some housing modules shown in cross-section along line 2—2 of FIGURE 1, with the cover exploded away therefrom.

FIGURE 3 is a top view of the positive external contact terminal body for use with an end module of a multiple-module cell housing block, such as shown in the module of FIGURES 1 and 2.

FIGURE 4 is an edge view of the terminal mounting body of FIGURE 3.

FIGURE 5 is a cross-sectional view of the same terminal body along lines 5—5 in FIGURE 3 with the terminal strip held therein.

FIGURE 6 is a top view of the external negative contact terminal body for another end module of a multiple-module cell housing block shown in FIGURES 1 and 2.

FIGURE 7 is an edge view of the terminal of FIGURE 6.

FIGURE 8 is a cross-sectional view of the terminal body of FIGURE 6 along lines 8—8 in FIGURE 6 with the terminal strip held therein.

FIGURE 9 shows the positive terminal body contact of FIGURES 3, 4 and 5 secured to the side wall of one housing end module of the multiple module housing of FIGURES 1 and 2.

FIGURE 10 illustrates the multiple-cell housing of FIGURES 1, 2 and 9 when adapted with the positive and negative contacts of FIGURES 3 through 8 which are each shown in cross-section to illustrate the insertion of conductors therein.

FIGURE 11 is a partial side cross-sectional view of the same multiple cell housing with sealed cells or batteries inserted therein and electrically connected together.

FIGURE 12 is a top view of the housing of FIGURE 11, and further illustrates in dotted lines the way individual modules could be arranged to form any desired irregular shape fitting within such irregularly shaped enclosure space of an apparatus supplied by the battery cells held in such multiple-module cell.

Referring first to FIGURES 1, 2 and 3, there is shown a novel battery housing body of the invention generally designated 20 of suitable electrical insulating material comprising an array or rows of a plurality of adjacent alike housing modules 21, 22 for housing a plurality of similar battery cells 90. The electric battery cells 90 may be any known type, for example, the type described in U.S. Patent No. 3,081,367 granted March 12, 1963. Each housing module 21, 22 may be formed or molded as a rectangularly shaped unit into which the cell is inserted. Any desired number of similar individually formed housing modules 21, 22 may be joined, as by cement, into an integral housing block having any desired irregular shape. FIGURE 2 shows a plurality of separately formed housing modules 21, 22 joined into a common block-like housing body 20 for housing therein a plurality of series-connected sealed battery cells 90.

Each housing module 21, 22 of the housing body is formed with a tubular cell chamber 23 extending between top wall surface 20–1 and the bottom wall surface 20–2 (FIGURE 2) for housing in each chamber 23 a sealed battery cell 90, as shown in the two cell chambers 22 at the right hand end of housing block 20. For simplifying the description, the upper region of the housing body 20, as seen in FIGURE 2, will be designated as the top or upper wall or wall surface and the opposite wall will be designated as the bottom or lower wall or wall surface of the housing body 20 and its modules 21, 22. However, in practical applications the housing body 20 may be placed in a variety of other positions and the top wall surface 20–1 can point in any direction.

Sealed battery cells 90, shown held in housing body 20, have usually a tubular metallic case 91 which encloses the electrode assembly and its electrolyte and which extends with its vertical axis coaxial with the axis of its respective housing chamber 23. The tubular metallic casing 91 of each such cell is connected to cell electrodes of one polarity. Each cell 90 has, at its top end, an opposite polarity metallic end terminal 92 insulatingly held by a top or upper casing end wall which is joined by a sealing joint to the open upper end of the tubular cell casing 90.

The housing chamber 23 of each housing module 21, 22 has a top or upper chamber opening at its top wall surface 20–1 for inserting therethrough the tubular casing 91 in the respective housing module chamber 23 so that the upper metallic end terminal 92 is exposed along the upper opening of each module chamber 23. FIGURE 1 shows in full lines an array of adjacent individual housing modules 21, 22 with their respective cell chambers 23 arranged in a row. However, the individual modules 21, 22 may be arrayed whereby their respective cell chambers 23 form an L-shaped or square shaped or cross shaped, or any other housing configuration conforming to a limited space available for a housing body 20 with the required number of power-supplying battery cells.

As an example, a sealed battery cell 90 of the nickel-cadmium type has in general a voltage output of 1.25 volts. By employing a housing body 20 of the invention consisting of a plurality of housing modules 21, 22 of the type described above, it is possible to insulatingly retain a plurality of such cells, which can be connected in series or series-parallel relation to provide some desired voltage and current capacity in an insulated housing structure that can dt within a limited peculiarly shaped space in the equipment with which it is to be used.

The individual housing modules 21, 22 may be molded as separate units, or a plurality of such module units 21, 22 may be molded as a single unit. In all cases each module unit has side walls 20–4. When formed as separate modules 21, 22, each module may be joined by the planar side wall surfaces, indicated by wall surface lines 20–3, of its side walls 20–4 to similar planar wall surfaces of adjacent modules, as by any of the known cements. FIGURE 1 shows by dash-double dot lines further similar module units 22–2 joined to the opposite side wall surfaces of the full-line housing 20 with its row of module units 21, 22.

In accordance with the invention a multiple-cell housing body 20 of the type described above and in connection with the example of FIGURES 1 and 2 has all its chamber openings facing upper end wall surface 20–1. The bottom of each housing module chamber 23 is partially closed by bottom wall portion 26 as seen in the empty chambers 23 to the left in FIGURE 1. As an example, this bottom chamber closure wall portion 26 may be given an X shape (FIGURE 1) so as to provide the bottom of each module chamber 26 with four bottom openings 26–1 adjoining the outer housing for assuring circulation of cooling air or fluid through the respective chamber 23 around the metallic cell casing 91 held therein.

The lower interior tubular wall surface of each of the cell module chambers 23 is provided with inward spacer projections 35 for holding the respective metallic cell casing 91 separated by a tubular shaped venting space from the surrounding chamber wall surface. These spacer projections 35 provide gripping action, which retains each cell casing 91 within the respective module chamber 23, even in inverted position, under all operating conditions. These spacer projections 35 provide around each tubular metallic cell casing 91 a tubular venting space through which air or cooling fluid may circulate by way of the top opening and the bottom openings 26–1 of each housing module 21, 22.

When made as separate housing module units 21, 22, each module has a transverse cross section with its exterior wall surface lines defining a square with each side wall surface being of rectangular shape. This makes it possible to join to each of the four exterior side wall surfaces 20–3 of each module similar side wall surfaces of four other such similar cell housing modules so as to form a multiple cell housing body of any required structural configuration.

The side wall surfaces 20–3 of each module unit 21, 22 (and of the similar modules 22–2) do not join or meet at their respective corners. Instead, they are provided at their respective corner regions with corner wall surfaces 20–5 which are inclined at an angle to the main side wall surfaces 20–3 (FIGURES 1 and 2). By providing each such housing module 21, 22 with an inclined corner wall surface 20–5, in an assembly of such housing modules 21, 22 with their side wall surfaces in abutting contact engagements, the inclined exterior corner surfaces 20–5 (FIGURE 1) define or provide between the modules a free venting or air space for circulating cooling air or fluid to suppress excessive temperature rise of the cells 90 when they are either heated by charging current or subjected to high-rate current discharges. When a plurality of housing modules 21, 22, 22–2 are placed in a large area housing as indicated by dash-double dot lines in FIGURE 1, such housing body may be molded with additional similar venting channels.

The interior wall surfaces of each module chamber 23, in the regions adjacent the central portion of each of its several side walls 20–4, are provided with a corresponding number of undercut portions or connector tab recesses 31 extending downward from the top surface 20–1 of the respective cell chamber 23 for a substantial height thereof. In addition, each of said several side walls 20–4 of each of such housing module 21, 22 has also formed along its top wall surface 20–1 an adjoining undercut tab recess 31–1 which, together with the respective interior chamber wall recesses 31 serve as the location and reception means for metallic straps or tab connectors 94 whereby, as described later (FIGURES 10 to 12), the metallic cell terminal casing 91 of one battery cell held in the cell chamber 23 in module 21 is connected to the opposite polarity top terminal 92 of the cell 90 held in the chamber 23 of any one of the four adjacent housing modules 22, 22–1, as seen in FIGURE 1. As an example, the metallic connector strip or tab 94 (FIGURE 2) has one end affixed, as by spot welding, to the metallic cell casing 91 of the cell 90 held in one module chamber 23, and has its opposite end metallically connected as by electric welding to the raised metallic opposite-polarity end terminal 92 of the battery cell 90 exposed at the opening of an adjacent cell chamber 23 in an adjacent housing module 22. Similar metal tabs 94 serve to join or connect in series a plurality of other similar battery cells held in a number of similar adjacent cell chambers 23 in an additional row of housing modules 22–2 assembled next to the row of housing modules 21, 22 shown in full lines in FIGURE 1. The end cell 90 of one row of such housing module 21, 22 is similarly connected in series by a similar metal tab 94 to the cell held in the housing module 22–2 of the adjacent row of housing modules with their similar series connected battery cells 90.

Furthermore, two or more groups of such series connected battery cells 90 may be connected in parallel by similar tab connectors to provide a desired large current of the voltage determined by the number of serially connected cells.

A multiple module housing body 20 of the type described above is provided with cover member 40 of FIGURE 2, shaped so as not to interfere with the top wall surface 20–1 or the connector tabs 94. After the cells 90 have been inserted into the cell chambers 23 the cover 40 is placed over the top wall surface 20–1 of the housing 20 and is secured thereto as by cementing, or is removably secured thereto as desired, so that individual cells can be removed and replaced. Even if joined by cement, the cover plate 40 may be removed by applying a suitable cement solvent to the edge of the cement junction between the cover plate 40 and the underlying cell-housing surface.

The manner in which cells are inserted into the individual chambers and electrically connected to one another will be discussed more fully hereinafter with reference to FIGURE 11. The cell housings 21, 22 serve not only to electrically insulate battery cells placed in adjacent cell chambers 23 but also to absorb shocks applied to the cell assembly. The cell housings 21, 22 also permit circulation of air or cooling fluid in the battery cell chambers 23 and permit low-cost fast off-the-shelf cell packaging in accordance with varying voltage current and housing shape requirements.

The cell housing of the invention, such as shown in FIGURES 1, 2, 10, 11, is also provided with polarized opposite-polarity terminals. As examples, positive contact terminal members may be formed as shown in FIGURES 3 through 5, and negative contact terminal members may be formed as shown in FIGURES 6 through 8.

Referring first to the positive contact terminal 50 of FIGURES 3, 4 and 5, the terminal body which may be molded of a suitable insulating material, such as polystyrene in the traditional red color to indicate positive potential, has projecting ribs 51 and 52 which serve as described hereinafter to polarize the contacts. The terminal body 50 is formed with two openings 53 and 54 for receiving and retaining metallic connector strip 50–1. Connector strip 50–1 extends from the cell of the adjacent module, passes under terminal body 50 through channel 71, is inserted through the openings 53 and 54 and is wrapped around the raised central portion 55 of terminal support body 50 as it again passes under terminal body 50 through channel 71. This will be illustrated more fully with reference to FIGURES 9 and 10.

The negative contact terminal 60, shown in FIGURES 6, 7 and 8, may be similarly molded of a high impact polystyrene in the traditional black color to indicate the negative contact. The negative terminal body 60 has two similar openings 61 and 62 which receive and retain metallic connector strip 60–1. Connector strip 60–1 extends from the cell of the adjacent module, passes under terminal body 60 through channel 82, is inserted through the openings 61 and 62 and is wrapped around the raised central portion 81 of terminal body 60 as it again passes under body 60 through channel 82.

The negative terminal body 60 does not have the extending ribs used in the positive terminal body 50 (FIGURES 3, 4 and 5) thereby polarizing the two terminal bodies. This assures that when the terminal bodies 50 and 60 are placed in their equipment, each negative terminal body can be connected to corresponding terminals having the rib arrangement in the positive contact of the equipment. In accordance with the invention, in the housing terminal body 60 without the projecting ribs its central body portion 81 over which the terminal strip 60–1 is folded can be inserted between the two rib projections 51–52 of the opposite polarity terminal body 50 and make contact with its connector strip 50–1 when the series connected cells 90 of two such housing bodies have to be connected to each other for supplying their combined output to a given load.

FIGURE 10 illustrates a side view of housing 20 as seen in FIGURE 2, with both the positive and negative housing terminal bodies 50, 60 shown in cross-section. Referring to FIGURE 10, it will be seen that the right hand end module 22 of housing 20 has the metallic contact strip 50–1 which extends from the enclosed cell 90 over the upper side wall recess 31–1 thereof and passes under terminal body 50 through the channel 71 (FIGURE 4), at the base surface of body 50 and then upwardly through body opening 53. Thereafter, the strip 50–1 comes over the outwardly projecting terminal body portion 55, and passes through opening 54, and then under and through the continuation of channel 71 of terminal body 50.

Thus, the exterior of contact body 50 presents the contact strip 50–1 as shown in FIGURE 9 between ribs 51 and 52, and is available for plug-in contact to a cooperating contact element. It is to be specifically noted that the conductor strip 50–1 which leaves housing 20 is first wrapped in position, as illustrated. The body 50 of the positive contact is thereafter appropriately cemented to the wall of the housing by its flanges 72 and 73 being so cemented. Channel 71 is, therefore, provided to provide a passage for strip 50–1 beneath terminal body 50, thereby precluding the strip 50 from preventing the flanges 72 and 73 from being cemented flush against the housing.

Thus, the complete operation may be performed without the need for special tools. Moreover, and as will be seen more fully hereinafter, the body 50 could have been cemented at any portion of the module housing, depending upon the particular requirements of the particular array.

The negative contact body is shown in FIGURE 10 as being secured to the left-hand side of housing 20 where a contact strip 60–1, which leaves the left-hand end of housing 20, is wrapped around the central portion 81 of body 60, which portion is contained between openings 61 and 62 of body 60. Channel 82 is provided to permit the strip 60–1 to be wrapped around the section 81 while still keeping the body of body 60 flush so that its flanges 83 and 84 can be cemented directly to housing 20.

FIGURES 11 and 12 illustrate in solid lines the manner in which electrical connection between adjacent cells is obtained within the housing 20 of FIGURES 1 and 2. More specifically, FIGURES 11 and 12 illustrate conventional sealed cells or batteries 90, each having, for example, a tubular metallic case 91 which is at a negative potential, and a positive terminal 92, insulatingly held at the top of each cell.

The plurality of cells 90 are connected in series in the following manner: as explained above, in accordance with the invention, each cell 90 has one end of a metallic connector strip 94 welded to the side of its tubular casing 91. Thereafter, the cells 90 with their connector strips 94 attached are inserted in the respective chambers 23 of the array of adjoining housing modules 21 and 22. The plurality of cells 90 are then connected in series by their conductive connector strips 94 which project upwardly from the tubular casings 91 being welded to the terminal 92 of a cell 90 in an adjacent chamber 23. More specifically, one arm of connector strip 94 of cell 90 in module 22 is received in the module chamber side wall channel recesses 31, 31–1 (FIGURES 1 and 2) and the other arm is carried over the abutting chamber side wall 20–4 with the left-hand end of connector strip 94 being electrically connected as by welding to the positive top terminal 92 of the cell 90 held in adjacent module 21. Thus, the two cells 90 of modules 21, 22 are connected in series. The similar cell 90 of the next adjacent module 22 is similarly connected in series by a similar strip 94 which extends into the recesses 31, 31–1 of the module 21 and extends to the positive terminal 92 of cell 90 held in the preceding module 22 of the array of modules. After all the battery cells of the array of modules 21, 22 are electrically connected in series, the terminal strip 60–1 from the cell 90 at one end of the series of cells, and a similar terminal strip 50–1 at the opposite end of the series of cells 90 are stretched and guided along the chamber recesses 31, 31–1 of their respective remote chamber side walls and are secured, as by cement, to their adjacent exterior housing wall portions. The strips 50–1 and 60–1 are then connected to terminal bodies, e.g. terminal bodies 50 and 60, in the manner described above. Thereafter housing cover 40 is permanently or removably secured to the top of housing 20.

FIGURE 12, which is a top view of FIGURE 11, further illustrates, in dotted lines, the flexibility of the novel housing module arrangement of the invention. While it shows a cell connector tab 94 of cell 90 in module 21 extending to the left, as viewed in FIGURE 12, of the module 21, it will be apparent that this cell connector tab 94 could extend as illustrated by the dotted line 94–2 for connection to the top terminal 92 of a cell 90 held in a module underlying tab 94–2. Chamber wall recesses 31, 31–1 serve to locate and retain the connector tabs 94 in relation to the other elements of the cell system, as explained above.

Alternatively, cell 90 of module 21 may have its connected strip extend as illustrated by dotted line connector strip 94–3 for connection to the top terminal 92 of a cell 90 held in an adjacent module 22–1. The opposite polarity connector tab 94–5 extending from the cell casing 91 of this cell may be connected to a similar cell held in another similar module adjoining any one of the three other exposed side walls of module 21–1. Thus the array of adjacent housing modules would have a generally L-shape with the connector tabs 94 extending from each module in any one of three additional different directions.

To further indicate the great flexibility of available module arrays, FIGURE 12 shows a further module 22–3 adjoining module 22 and extending away therefrom in a direction differing from the directions of extension of modules 21, 22–1. A connector strip 94–5 extending from casing side wall 91 of cell 90 in module 22 may then be connected to top terminal 92 of the cell 90 held in module 22–3 which may adjoin any of the three exposed side walls of module 22.

The exemplifications of the invention described above will suggest various other modifications thereof. As an example, each housing module such as shown at 21 and 22 in FIGURES 10 to 12, may be formed with only three generally planar exterior side wall surfaces the cross-section of which is an equilateral triangle or with six planar side wall surfaces, the cross-section of which constitutes an equilateral hexagon. An array of each such triangle-shaped or hexagon-shaped modules may be assembled into a closely packed module structure of any desired configuration.

The principles underlying the invention described in connection with specific exemplifications will suggest other modifications thereof. It is accordingly desired that the appended claims shall not be limited to specific features shown or described in connection with these exemplifications.

The embodiments of the invention in which an exclusive privilege or property is claimed are defined as follows:

1. In a multiple-battery-cell housing consisting of a plurality of alike insulating housing modules and adapted to fit different irregularly shaped remaining enclosure spaces left in the enlosure of an electrical apparatus supplied by a plurality of alike sealed battery cells,
   each cell having a tubular metallic cell casing constituting one cell terminal with side walls extending parallel to the cell axis and an open end sealed by a casing end wall having an opposite polarity cell terminal,
   each housing module having tubular side walls with a set of four mutually perpendicular exterior wall surfaces extending parallel to a module axis and affixed to a similar surface of an adjacent module into said multiple cell housing,
   each housing module having an axially extending tubular interior chamber with an entrance opening at one end of its axis for insertion and coaxially holding between said module side walls one of said cells with said opposite cell terminal held along said module opening,
   a connecting conductor affixed to the cell of one cell held in one module and having a remote conductor portion affixed to the cell terminal exposed at the open end portion of an adjacent module for connecting the cells of said housing modules into a common circuit,
   an external flat terminal support of insulating substance having a rear surface attached to an exterior side wall surface of one of said modules,
   said support having first and second parallel slots therein, and first and second raised rear surface seating portions spaced from each other by an elongated recess channel and extending transversely across the end regions of said two slots below its exterior support surface, and
   a metallic terminal conductor strip passing through said two slots and having an intermediate strip length held exposed along the intermediate exterior support surface between said two slots
   with one adjoining strip length extending through said support channel and below the level of said intermediate strip length and
   with the opposite adjoining strip length extending through a length of said support channel from its slot to beyond the nearby edge region of said support and connected to one terminal of the cell housed in said module.

2. In a multiple cell module housing as claimed in claim 1,
   all the open chamber ends of said modules being aligned with each other and facing in the same direction,
   said connecting conductor extending from a side wall of a cell casing held in one module and having its remote conductor portion affixed to the terminal casing portion exposed at the open end portion of an adjacent module.

3. In a multiple cell module housing as claimed in claim 1,
   a similar flat external opposite-polarity terminal support attachable with a similar channel-spaced rear surface region to one of said exterior module wall surfaces hold in similar slots an opposite-polarity similar metallic terminal strip,
   said opposite-polarity terminal support having on its exterior surface two polarizing ribs extending transversely generally parallel to the length of its terminal strip,
   said polarizing ribs projecting beyond the level of its exposed metal strip length and polarizing the terminal strip of said two terminal supports relatively to each other, and connected to an opposite polarity terminal of the cell housed in another module.

4. In a multiple cell module housing as claimed in claim 3,
   all the open chamber ends of said modules being aligned with each other and facing in the same direction,
   said connector conductor extending from a side wall of a cell casing held in one module and having its remote conductor portion affixed to the terminal casing portion exposed at the open end portion of an adjacent module.

References Cited by the Examiner

UNITED STATES PATENTS

| 772,415 | 10/1904 | Jackson | 136—173 |
| 911,522 | 2/1909 | Patterson | 136—173 |
| 2,590,804 | 3/1952 | Vitale | 136—173 |
| 3,110,634 | 11/1963 | Bradshaw | 136—173 |
| 3,155,767 | 11/1964 | Schellack. | |

FOREIGN PATENTS 905,222  9/1962  Great Britain.

ALLEN B. CURTIS, *Primary Examiner.*

WINSTON A. DOUGLAS, *Examiner.*

D. L. WALTON, *Assistant Examiner.*